United States Patent Office 2,845,463
Patented July 29, 1958

2,845,463

PRODUCTION OF ALCOHOLS AND ETHERS

Bernard S. Friedman, Chicago, and Fred L. Morritz, Park Forest, Ill., assignors to Sinclair Refining Company, New York, N. Y., a corporation of Maine No Drawing. Application June 10, 1955
Serial No. 514,708

4 Claims. (Cl. 260—614)

Our invention relates to an improved method for the hydration of monoolefin hydrocarbons.

It is old in the art to hydrate monoolefin hydrocarbons, particularly those containing from 2 to 4 carbon atoms, to produce oxygenated products which are generally alcohols or ethers and polymer. For example, propylene has thus been hydrated to produce isopropyl alcohol, diisopropyl ether and polypropylene. The relative proportions of ether and alcohol produced depend upon the reaction conditions which are used, and the amount of polymer produced is generally minor. As catalysts for the hydration reaction, acidic organic ion exchange resins containing sulfonic, phosphonic, phosphinic or carboxylic acid groups are effective. In operation, however, they become deactivated due to the polymerization or condensation of impurities such as allene, methylacetylene, vinylacetylene, related diolefins and acetylenes, and oxygenated hydrocarbons, etc., which are present in the feed. When thus deactivated, the resins are not conveniently reactivated, and it is the object of our invention to provide a procedure wherein the resins do not become deactivated so rapidly. This is accomplished by first passing the monoolefin hydrocarbon through a bed of an inorganic hydration catalyst at a temperature above about 200° F. but below that at which substantial polymerization of the monoolefin takes place and then passing the monoolefin hydrocarbon into the bed of acidic organic ion exchange resin to hydrate the olefin. Depending upon the reaction conditions, a certain amount of hydration can take place in the bed in such manner that the larger amount of conversion of the monoolefin hydrocarbon to hydration products is effected by the acidic ion exchange resin.

The allene, methyl acetylene, vinyl acetylene and related compounds present in the feed polymerize and contaminate the inorganic hydration catalyst, but this is not a great disadvantage, inasmuch as those catalysts are readily regenerated, for example, by the use of air or mixtures of air and flue gas at temperatures to burn off the absorbed contaminants.[1] Among the inorganic hydration catalysts which can be employed in the process of our invention are acid treated clays or aluminas obtained, for example, by hydrogen fluoride treatment, tungsten oxide, silica-alumina and the like.

As a specific illustration, a mixture of 100 pounds of water per hour, 140 pounds of propane per hour, and 240 pounds of propylene per hour is introduced into the top of a column containing 10 gallons of silica-alumina cracking catalyst analyzing 90 percent silicon dioxide by weight and 10 percent alumina by weight. The reaction conditions in the tower are maintained at 600 p. s. i. g. and 300° F. Effluent is removed from the bottom of the tower and introduced into the top of a second tower containing 100 gallons of polystyrene sulfonic acid resin, this tower also being operated at 300° F. and 600 p. s. i. g.. The effluent from the bottom of the tower contains propane, unreacted propylene, isopropyl alcohol, isopropyl ether, propylene polymer and water which can be fractionated in known manner to provide an alcohol-ether-polymer mixture suitable for incorporation into gasoline.

Various modifications can be made in the procedure of the specific illustration to provide other embodiments which fall within the scope of our invention. Thus, our process is generally applicable to the hydration of monoolefin hydrocarbons containing from 2 to 4 carbon atoms, or mixtures thereof, or mixtures of individual monoolefin hydrocarbons and the corresponding saturated hydrocarbons containing at least about 25 percent by weight of the monoolefin hydrocarbon. Thus, pure propylene, ethane-ethylene mixtures and butane-butylene mixtures and mixtures containing $C_2$, $C_3$ and $C_4$ olefins constitute a suitable feed source for our process. The inorganic hydration catalyst can be any of those known in the art, for example, acid treated clays of alumina, tungsten oxide or the silica-alumina cracking catalyst. We prefer to utilize a silica-alumina cracking catalyst, generally one analyzing from 5 to 35 percent by weight of alumina. As those skilled in the art will understand, the reaction conditions in the vessel containing the inorganic hydration catalyst can be varied considerably without producing undue polymerization of monoolefin present in the feed. In general, however, a temperature within the range from about 200 to 500° F. and a pressure within the range from about 500 to 3,000 p. s. i. g. will be used.

As a further alternative procedure falling within the scope of our invention, it is not essential that any water of hydration be introduced into the bed containing the inorganic hydration catalyst. For example, a portion of the water of hydration can be introduced into that bed and the remainder into the bed of acidic organic ion exchange resin, or the total amount of water required for the hydration of the monoolefin hydrocarbon can be introduced into the bed of acidic organic ion exchange resin without any being introduced into the bed of inorganic hydration catalyst.

We claim:

1. In the hydration with water of a monoolefin containing from 2 to 4 carbon atoms to alcohols, ethers, and polymer by contacting the monoolefin with a fixed bed of an acidic organic ion exchange resin, the step of passing the monoolefin through a bed of an inorganic hydration catalyst at a temperature above about 200° F. but below that at which substantial polymerization of the monoolefin takes place, and then passing the monoolefin into the bed of acidic organic ion exchange resin.

2. The process according to claim 1 wherein said monoolefin is propylene.

3. The process according to claim 1 wherein said inorganic hydration catalyst is silica-alumina.

4. The process according to claim 1 wherein said acidic organic ion exchange resin is polystyrene sulfonic acid.

References Cited in the file of this patent

UNITED STATES PATENTS

| | | |
|---|---|---|
| 2,057,283 | Peski et al. | Oct. 13, 1936 |
| 2,116,061 | Dorrer | May 3, 1938 |
| 2,477,380 | Kreps et al. | July 26, 1949 |
| 2,480,940 | Leum et al. | Sept. 6, 1949 |
| 2,658,924 | Lukasiewicz et al. | Nov. 10, 1953 |

---

[1] The polymeric tars formed from these contaminants can be removed by distillation from the feed to the acidic organic ion exchange resin.